(12) United States Patent
Moore et al.

(10) Patent No.: US 8,158,301 B2
(45) Date of Patent: Apr. 17, 2012

(54) POLYELECTROLYTE MEMBRANES AND METHODS FOR MAKING

(75) Inventors: David Roger Moore, Albany, NY (US); Hongyi Zhou, Niskayuna, NY (US); Joyce Hung, Auburn, AL (US); Ryo Tamaki, Valencia, CA (US); Hieu Minh Duong, Rosemead, CA (US); Marianne Elisabeth Harmon, Redondo Beach, CA (US)

(73) Assignee: General Electric Company, Schenectady, NY (US)

(*) Notice: Subject to any disclaimer, the term of this patent is extended or adjusted under 35 U.S.C. 154(b) by 959 days.

(21) Appl. No.: 12/128,660

(22) Filed: May 29, 2008

(65) Prior Publication Data

US 2009/0297911 A1    Dec. 3, 2009

(51) Int. Cl.
*H01M 8/10* (2006.01)
*H01M 8/00* (2006.01)
*H01M 6/18* (2006.01)

(52) U.S. Cl. ........ 429/491; 429/479; 429/492; 429/535; 429/304; 429/306

(58) Field of Classification Search .......... 429/479, 429/491, 492, 535, 304, 306
See application file for complete search history.

(56) References Cited

U.S. PATENT DOCUMENTS

| | | | |
|---|---|---|---|
| 5,283,310 A * | 2/1994 | Armand et al. ............ 528/30 |
| RE37,701 E | 5/2002 | Bahar et al. | |
| 6,635,384 B2 | 10/2003 | Bahar et al. | |
| 7,381,331 B2 | 3/2008 | Duong et al. | |
| 7,393,914 B2 | 7/2008 | Moore et al. | |
| 7,488,559 B2 * | 2/2009 | Inagaki et al. ............ 429/317 |
| 2004/0053060 A1 | 3/2004 | Roziere et al. | |
| 2004/0081886 A1 | 4/2004 | Zuckerbrod et al. | |
| 2007/0100131 A1 | 5/2007 | Hung et al. | |
| 2007/0112169 A1 | 5/2007 | Brunelle et al. | |
| 2007/0112170 A1 | 5/2007 | Brunelle et al. | |
| 2007/0142613 A1 | 6/2007 | Hung et al. | |
| 2007/0142614 A1 | 6/2007 | Hung et al. | |
| 2007/0238856 A1 | 10/2007 | Moore et al. | |
| 2008/0004443 A1 | 1/2008 | Brunelle et al. | |
| 2008/0114149 A1 | 5/2008 | Moore et al. | |
| 2008/0114183 A1 | 5/2008 | Moore et al. | |

FOREIGN PATENT DOCUMENTS

| | | |
|---|---|---|
| EP | 1085038 A1 | 3/2001 |
| EP | 1223632 A2 | 7/2002 |
| EP | 1585183 A1 | 10/2005 |
| WO | 0205370 A1 | 1/2002 |

OTHER PUBLICATIONS

European Search Report issued in connection with corresponding Application No. EP09160711.9-1227 on Oct. 6, 2009.

(Continued)

*Primary Examiner* — Patrick Ryan
*Assistant Examiner* — Julian Anthony
(74) *Attorney, Agent, or Firm* — GE Global Patent Operation; Catherine J. Winter

(57) ABSTRACT

A polymer electrolyte membrane includes a porous base membrane and electrolytes dispersed within the pores of the base membrane. The electrolytes include metal oxide compounds having acid functionality. A process for making the membrane is also provided. The membrane is compatible, durable, highly conductive, mechanically strong and dimensionally stable.

29 Claims, 5 Drawing Sheets

OTHER PUBLICATIONS

Li, et al. "Synthesis and properties of phosphonic acid-grafted hybrid inorganic-organic polymer membranes." Journal of Materials Chemistry; Dec. 19, 2005.

Chen, et al. "Preparation of Three-Dimensionally Ordered Inorganic/Organic Bi-Continuous Composite Proton Conducting Membranes." Chemical Materials, 2005, v.17, pp. 5808-5883.

Yamaguchi, et al. "A Pore-Filling Electrolyte Membrane-Electrode Integrated System . . . Methanol Fuel Cell Application." Joural of the Electrochemical Society, A1448-A1453 2002.

Yamaguchi, et al. "Pore-filling type polymer electrolyte membranes for a direct methanol fuel cell." Journal of membrane Science 214 (2003) pp. 283-292.

Yamaguchi, et al. "Polymer Electrolyte Membranes with a Pore-Filling Structure for a Direct Methanol Fuel Cell." Advanced Materials, 2003, 15, No. 14, Jul. 17.

* cited by examiner

POLYELECTROLYTE MEMBRANES AND METHODS FOR MAKING

FIELD OF THE INVENTION

This invention relates to composite membranes and more particularly, to polymer electrolyte membranes.

BACKGROUND OF THE INVENTION

Polymer electrolyte membranes may be used in fuel cells, which provide a clean, alternative power source for automotive and portable applications. The polymer electrolyte membrane should have high proton conductivity, good chemical and mechanical stability, good dimensional stability and strength. Perfluorosulfonic acid polymers, such as Nafion®, provide good conductivity and are often used in polymer electrolyte membranes. These materials can be quite costly to use and are susceptible to dimensional changes from swelling and shrinking, which can cause structural failure of the membrane resulting in cracks, tears or other deformations.

Preformed networks or porous supports and crosslinked networks of nonconductive materials are often used in membranes to provide strength and stability. Electrolytes are imbedded into the pores of the porous support to provide conductivity and are prevented from swelling by the network structure of the porous support. Silanes with acid functional groups have been used as starting materials for electrolytes, but the resulting membranes can be too brittle.

What is needed is a polymer electrolyte membrane having improved mechanical strength and dimensional stability with increased acid functional groups for improved conductivity.

SUMMARY OF THE INVENTION

In one embodiment, a polymer electrolyte membrane comprises a porous base membrane and electrolytes disposed within pores of the porous base membrane, said electrolytes comprising metal oxide compounds having acid functionality.

In another embodiment, a method for making a polymer electrolyte membrane by impregnating the pores of a porous base membrane with metal oxide precursors having acid functionality and reacting the metal oxide precursors to form metal oxide compounds having acid functionality.

The various embodiments provide a more compatible and more durable membrane that is highly conductive, mechanically strong and dimensionally stable.

DETAILED DESCRIPTION OF THE INVENTION

The singular forms "a," "an" and "the" include plural referents unless the context clearly dictates otherwise. The endpoints of all ranges reciting the same characteristic are independently combinable and inclusive of the recited endpoint. All references are incorporated herein by reference.

The modifier "about" used in connection with a quantity is inclusive of the stated value and has the meaning dictated by the context (e.g., includes the tolerance ranges associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

In one embodiment, a polymer electrolyte membrane comprises a porous base membrane and electrolytes disposed within pores of the porous base membrane, said electrolytes comprising metal oxide compounds having acid functionality.

The porous base membrane has a plurality of pores. In one embodiment, the base membrane has a three-dimensional matrix or lattice type structure with a plurality of nodes interconnected by a plurality of fibrils. The interconnections between the nodes and fibrils define the pores in the base membrane, which are open spaces or voids. The surfaces of the nodes and fibrils define numerous interconnecting pores that extend completely through the membrane.

In one embodiment, the base membrane has a continuous pore structure. In another embodiment, the porous base membrane has a porosity of greater than about 20 percent by volume. In another embodiment, the porosity may be in a range of from about 30 percent to about 99 percent by volume. In another embodiment, the porosity is in a range of from about 50 percent to about 97 percent by volume, including from about 70 percent to about 97 percent by volume.

Pore diameter may be uniform from pore to pore, and the pores may define a predetermined pattern. Alternatively, the pore diameter may differ from pore to pore, and the pores may define an irregular pattern. The pores sizes in the base membrane may cover a broad pore size range. In one embodiment, the average pore size of the pores in the base membrane is microporous. In one embodiment, the pore diameters may be less than about 50 micrometers. In another embodiment, an average pore diameter is in a range of from about 0.05 micrometer to about 50 micrometers. In another embodiment, the average pore diameter is from about 0.1 micrometer to about 10 micrometers, including from about 0.2 micrometer to about 5 micrometers.

Figure 1:
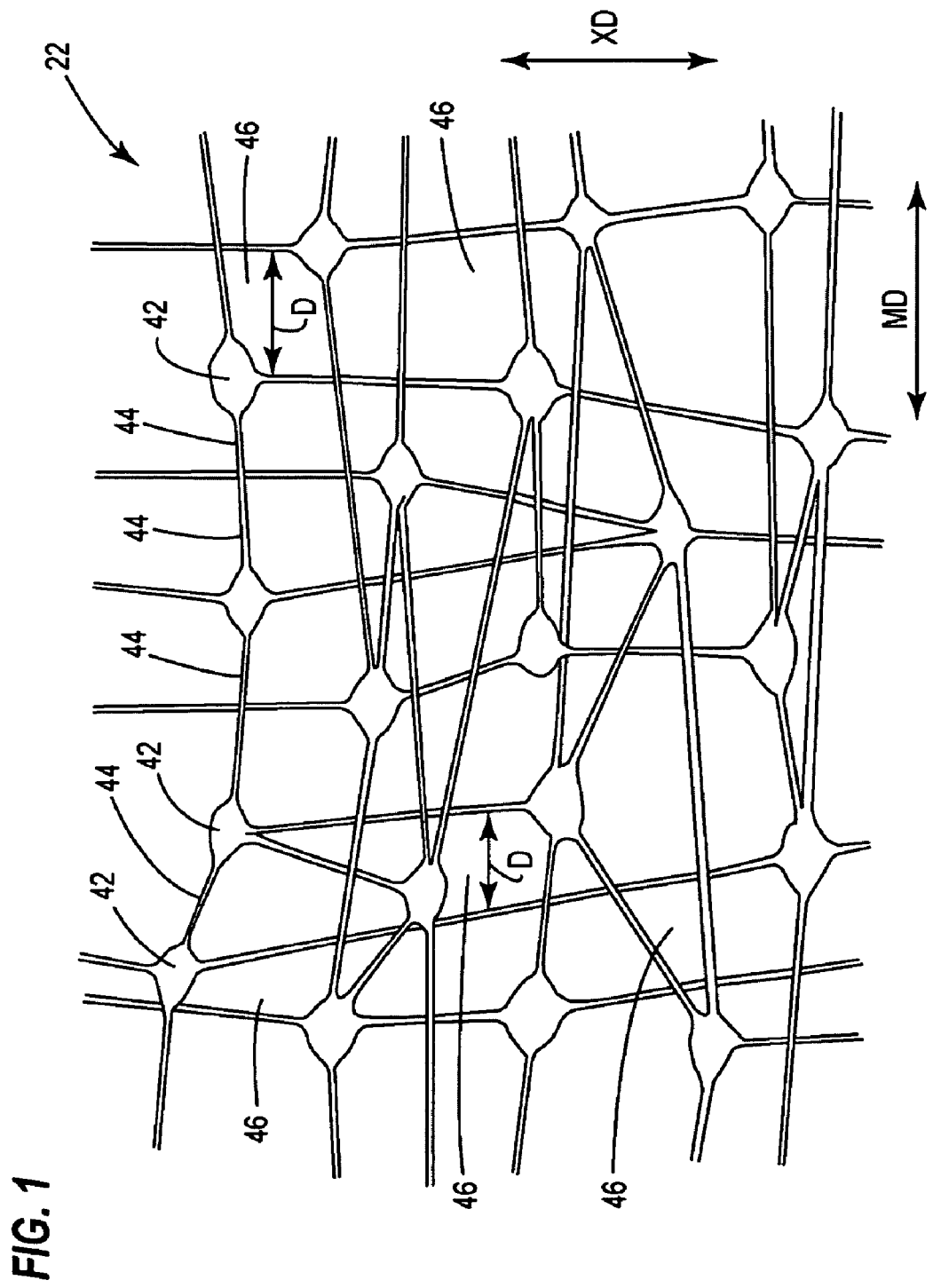
FIG. 1 is a plan view of an exemplary embodiment of a base membrane.

FIG. 1 is a plan view of a base membrane 22 in accordance with an exemplary embodiment. In the exemplary embodiment, base membrane 22 is porous, and in one embodiment, microporous, with a three-dimensional matrix or lattice type structure including a plurality of nodes 42 interconnected by a plurality of fibrils 44. Surfaces of nodes 42 and fibrils 44 define numerous interconnecting pores 46 that extend completely through membrane 22 between opposite major side surfaces in a tortuous path. In one embodiment, the average effective pore size D for pores 46 in base membrane 22 may be in the micrometer range. In one embodiment, the average pore size is in the range of about 0.01 micron to about 10 microns, and in another embodiment, in the range of about 0.1 micron to about 5.0 microns.

The base membrane may be any material or blend of materials that is suitable for forming a base membrane with an open pore structure. In one embodiment, the base membrane includes, but is not limited to, polytetrafluoroethylene, polyvinylidene fluoride, polyvinylidene fluoride co-hexafluoropropylene, polytetrafluoroethylene oxide-co-difluoromethylene oxide, polytetrafluoroethylene-co-perfluoropropylvinyl ether, polyolefin, polyamide, polyester, polysulfone, polyether, acrylic-based polymers, including polyacrylate and polymethacrylate, polystyrene, polyurethane, polypropylene, polyethylene, polyphenylene sulfone, nylon, polyphenylene oxide, cellulosic polymer and combinations thereof. In an exemplary embodiment, the porous base membrane comprises expanded polytetrafluoroethylene (ePTFE).

In one embodiment, the base membrane is made by extruding a mixture of polytetrafluoroethylene (PTFE) fine powder particles and lubricant. The extrudate is then calendared. The calendared extrudate is then "expanded" or stretched in at least one and preferably two directions, machine direction (MD) and cross direction (XD), to form fibrils and connecting nodes to define a three-dimensional matrix or lattice type of structure. "Expanded" is intended to mean sufficiently stretched beyond the elastic limit of the material to introduce permanent set or elongation to the fibrils.

The base membrane may be heated or "sintered" to reduce and minimize residual stress in the membrane material by changing portions of the material from a substantially crystalline state to a substantially amorphous state. In one embodiment, the base membrane is unsintered or partially sintered. In another embodiment, the porous base membrane comprises expanded polytetrafluoroethylene that has been at least partially sintered. Generally, the size of a fibril that has been at least partially sintered is in the range of about 0.05 micron to about 0.5 micron in diameter taken in a direction normal to the longitudinal extent of the fibril. The specific surface area of the porous base membrane is in the range of about 0.5 square meters per gram of membrane material to about 110 square meters per gram of membrane material.

Other suitable methods of making the base membrane include foaming, skiving or casting any of the suitable materials. The base membrane may be rendered permeable by perforating, stretching, expanding, bubbling or extracting the base membrane. In another embodiment, the base membrane is formed from woven or non-woven fibers of the above described materials, such as PTFE.

In one embodiment, the base membrane has a thickness less than about 1 mil. In another embodiment, the base membrane has a thickness from about 10 micrometers to about 5 mm. In another embodiment, the layer thickness is from about 10 micrometers to about 1 mm. In another embodiment, the layer thickness is from about 10 micrometers to about 100 micrometers. In one embodiment, the membrane may be formed from a plurality of differing layers.

Perpendicular to the direction of fluid flow, the membrane may have a width of greater than about 10 millimeters. In one embodiment, the membrane may have a width in a range of from about 10 millimeters to about 2 meters. In another embodiment, the membrane has a width in a range of from about 50 millimeters to about 100 centimeters, including from about 10 centimeters to about 100 centimeters. The width may be a diameter of a circular area, or may be the distance to the nearest peripheral edge of a polygonal area. In one embodiment, the membrane may be rectangular, having a width in the meter range and an indeterminate length. That is, the membrane may be formed into a roll with the length determined by cutting the membrane at predetermined distances during a continuous formation operation.

The electrolytes comprise metal oxide compounds having acid functionality. The electrolytes contain acid functionality to provide conductivity to the membrane and are also crosslinked to strengthen the composite membrane and prevent the electrolytes from leaching out of the membrane. The electrolyte material is compatible with the base membrane and provides strong interactions with the base membrane materials. The metal oxide compounds can withstand elevated temperatures and can be used in harsh environments.

The electrolytes are dispersed within the pores of the porous base membrane to provide conductivity to the membrane. The conductivity of the membrane increases as the open spaces in the porous structure are filled with the electrolytes. In one embodiment, the electrolytes at least partially occlude the porous structure. In another embodiment, the electrolytes fill 90% or more of the pores or interior volume of the membrane. In another embodiment, the electrolytes fully occlude the porous structure. In one embodiment, the electrolytes fill the membrane, so that the membrane contains no pin holes or other discontinuities throughout the membrane structure.

The metal oxide compounds may be any type of compound containing a metal oxide that is suitable for forming crosslinked metal oxide networks by a sol-gel process. In one embodiment, the metal oxide includes metalloid oxides. In one embodiment, the metal oxide includes, but is not limited to, silica, aluminum oxide, titanium oxide, zirconium oxide, tin oxide and germanium oxide.

The metal oxide compound has acid functionality, which provides conductive properties to the electrolyte. The acid functional groups may be any type of acid group or latent acid group that will be hydrolyzed to an acid group. In one embodiment, the acid functional groups are sulfonic acid, perfluorinated sulfonic acid, partially fluorinated sulfonic acid, sulfonyl halide, perfluorinated sulfonyl halide, partially fluorinated sulfonyl halide, dialkylphosphonate, phosphonic acid, carboxylic acid, carbonyl halide or the alkaline salt forms of the foregoing. The sulfonyl halides may include, but are not limited to, sulfonyl chloride or sulfonyl fluoride. The perfluorinated sulfonyl halides may include, but are not limited to, perfluorinated sulfonyl chloride or perfluorinated sulfonyl fluoride. The partially fluorinated sulfonyl halides may include, but are not limited to, partially fluorinated sulfonyl chloride or partially fluorinated sulfonyl fluoride. The carbonyl halides may include, but are not limited to, carbonyl chloride, carbonyl fluoride or carbonyl iodide. The dialkylphosphonate may include, but is not limited to, diethylphosphonate or dimethylphosphonate.

In one embodiment, the metal oxide compound having acid functionality comprises at least one structural unit selected from the group consisting of formula I and formula II:

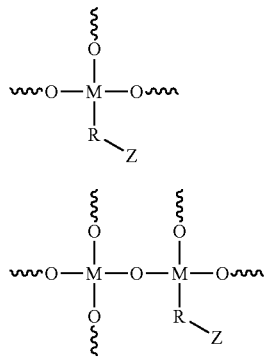

wherein M is independently at each occurrence a metal or metalloid selected from the group consisting of Si, Al, Ti, Zr, Sn and Ge; R is independently at each occurrence an aliphatic or aromatic diradical or bond; and Z is independently at each occurrence an acid functional group.

In one embodiment, the aliphatic diradical may be a $C_1$-$C_{30}$ aliphatic group. In another embodiment, the aliphatic group may be methylene, 1,2-ethylene, 1,2-propylene, 1,2-butylene, 1.5-pentamethylene, 2,5-pentylene, 3,5-pentylene, 2,2-dimethyl-1,3-propylene, 1,6-hexylene, 1,7-heptylene, 1,8-octylene, 1,10-decylene, 1,12-dodecylene, 2-methyl-1,2-propylene or 1,2-cyclohexylene.

In one embodiment, the aromatic diradical may be a $C_6$-$C_{30}$ aryl group. In another embodiment, the aromatic group is a metaphenylene, paraphenylene, 3,4-tolylene, 3,4-pyridinylene, 4,5-pyrimidylene or 1,8-naphthylene.

In one embodiment, the acid functional group is sulfonic acid, perfluorinated sulfonic acid, partially fluorinated sulfonic acid, sulfonyl halide, perfluorinated sulfonyl halide, partially fluorinated sulfonyl halide, dialkylphosphonate, phosphonic acid, carboxylic acid, carbonyl halide or alkaline salt forms of the foregoing. The sulfonyl halides may include, but are not limited to, sulfonyl chloride or sulfonyl fluoride. The perfluorinated sulfonyl halides may include, but are not limited to, perfluorinated sulfonyl chloride or perfluorinated sulfonyl fluoride. The partially fluorinated sulfonyl halides may include, but are not limited to, partially fluorinated sulfonyl chloride or partially fluorinated sulfonyl fluoride. The carbonyl halides may include, but are not limited to, carbonyl chloride, carbonyl fluoride or carbonyl iodide. The dialkylphosphonate may include, but is not limited to, diethylphosphonate or dimethylphosphonate.

In one embodiment, M is silicon. In another embodiment, the metal oxide compound comprises a silicon-oxygen network. In one embodiment, the silicon oxide compound having acid functionality comprises at least one structural unit selected from the group consisting of formula III and formula IV:

$$[ASiO_{3/2}]_n \qquad \qquad \text{III}$$

$$[ASiO_{3/2}]_m[SiO_2]_n \qquad \qquad \text{Iv}$$

wherein A is —R—Z; R is independently at each occurrence an aliphatic or aromatic diradical or bond; Z is independently at each occurrence an acid functional group; n is a number from about 2 to about 1000; and m is a number from about 2 to about 1000.

In one embodiment, the aliphatic diradical may be a $C_1$-$C_{30}$ aliphatic group. In another embodiment, the aliphatic group may be methylene, 1,2-ethylene, 1,2-propylene, 1,2-butylene, 1,5-pentamethylene, 2,5-pentylene, 3,5-pentylene, 2,2-dimethyl-1,3-propylene, 1,6-hexylene, 1,7-heptylene, 1,8-octylene, 1,10-decylene, 1,12-dodecylene, 2-methyl-1,2-propylene or 1,2-cyclohexylene.

In one embodiment, the aromatic diradical may be a $C_6$-$C_{30}$ aryl group. In another embodiment, the aromatic group is a metaphenylene, paraphenylene, 3,4-tolylene, 3,4-pyridinylene, 4,5-pyrimidylene or 1,8-naphthylene.

In one embodiment, the acid functional group is sulfonic acid, perfluorinated sulfonic acid, partially fluorinated sulfonic acid, sulfonyl halide, perfluorinated sulfonyl halide, partially fluorinated sulfonyl halide, dialkylphosphonate, phosphonic acid, carboxylic acid, carbonyl halide or alkaline salt forms of the foregoing. The sulfonyl halides may include, but are not limited to, sulfonyl chloride or sulfonyl fluoride. The perfluorinated sulfonyl halides may include, but are not limited to, perfluorinated sulfonyl chloride or perfluorinated sulfonyl fluoride. The partially fluorinated sulfonyl halides may include, but are not limited to, partially fluorinated sulfonyl chloride or partially fluorinated sulfonyl fluoride. The carbonyl halides may include, but are not limited to, carbonyl chloride, carbonyl fluoride or carbonyl iodide. The dialkylphosphonate may include, but is not limited to, diethylphosphonate or dimethylphosphonate.

In one embodiment, n is a number from about 10 to about 1000. In another embodiment, n is a number from about 10 to about 500, including from about 50 to about 500. In another embodiment, n is a number from about 50 to about 100. In one embodiment, m is a number from about 10 to about 1000, including from about 50 to about 500. In another embodiment, m is a number from about 50 to about 100.

The metal oxide compounds are prepared by a sol-gel reaction of acid functionalized metal oxide precursors. The acid functionalized metal oxide precursors are hydrolyzed and condensed in a solvent to form acid functionalized metal oxide particles, which will crosslink to form a metal oxide, sol-gel network. The metal oxide network forms an interpenetrating network or a cross-linked structure that mechanically binds the network to the base membrane by interlinking with the pores of the base membrane.

In one embodiment, the acid functionalized metal oxide precursor has formula V:

$$A_aMX_{4-a} \qquad \qquad \text{V}$$

wherein A is —R—Z; R is independently at each occurrence an aliphatic or aromatic diradical or bond; Z is independently at each occurrence an acid functional group; X is a halogen or a $C_1$-$C_{10}$ alkoxy radical; M is a metal or metalloid selected from the group consisting of Si, Al, Ti, Sn, Zr and Ge; and a is a number from about 1 to about 3.

In one embodiment, the aliphatic diradical may be a $C_1$-$C_{30}$ aliphatic group. In another embodiment, the aliphatic group may be methylene, 1,2-ethylene, 1,2-propylene, 1,2-butylene, 1,5-pentamethylene, 2,5-pentylene, 3,5-pentylene, 2,2-dimethyl-1,3-propylene, 1,6-hexylene, 1,7-heptylene, 1,8-octylene, 1,10-decylene, 1,12-dodecylene, 2-methyl-1,2-propylene or 1,2-cyclohexylene.

In one embodiment, the aromatic diradical may be a $C_6$-$C_{30}$ aryl group. In another embodiment, the aromatic group is a metaphenylene, paraphenylene, 3,4-tolylene, 3,4-pyridinylene, 4,5-pyrimidylene or 1,8-naphthylene.

In one embodiment, the acid functional group is sulfonic acid, perfluorinated sulfonic acid, partially fluorinated sulfonic acid, sulfonyl halide, perfluorinated sulfonyl halide, partially fluorinated sulfonyl halide, dialkylphosphonate, phosphonic acid, carboxylic acid, carbonyl halide or alkaline salt forms of the foregoing. The sulfonyl halides may include, but are not limited to, sulfonyl chloride or sulfonyl fluoride. The perfluorinated sulfonyl halides may include, but are not limited to, perfluorinated sulfonyl chloride or perfluorinated sulfonyl fluoride. The partially fluorinated sulfonyl halides may include, but are not limited to, partially fluorinated sulfonyl chloride or partially fluorinated sulfonyl fluoride. The carbonyl halides may include, but are not limited to, carbonyl chloride, carbonyl fluoride or carbonyl iodide. The dialkylphosphonate may include, but is not limited to, diethylphosphonate or dimethylphosphonate.

In one embodiment, X is methoxy, ethoxy, Cl, Br or I.

In one embodiment, M is silicon.

In another embodiment, the acid functionalized metal oxide precursor is selected from the group consisting of trihalosilanes, trialkoxysilanes, trihalodisilanes, trialkoxydisilanes and disilazanes. The trialkoxysilanes include, but are not limited to, diethylphosphatotriethoxysilane, 2-(4-chlorosulfonylphenyl)ethyltrimethoxysilane, 3-(trihydroxysilyl)-1-propane-sulfonic acid, carboxyethylsilanetriol sodium salt, N-trimethoxysilylpropylethylenediamine triacetic acid trisodium salt or 3-trihydroxysilylpropylmethylphosphonate sodium salt. The trihalosilanes include, but are not limited to, trichlorosilanes and tribromosilanes. In one embodiment, the trihalodisilanes is 2-(4-chlorosulfonylphenyl)ethyltrichlorosilane.

The sol-gel reaction may occur at ambient temperature or at an elevated temperature. In one embodiment, the reaction temperature is from about 24° C. to about 250° C. In another embodiment, the reaction temperature is from about 24° C. to about 150° C.

Acid catalysts and base catalysts may be used to adjust the pH of the reaction and catalyze the reaction. In one embodiment, the acid catalyst is hydrochloric acid or sulfuric acid. In another embodiment, the base catalyst is sodium hydroxide, potassium hydroxide or ammonium hydroxide.

Other catalysts may be used to promote the sol-gel reaction. The catalysts may be used alone or may be used in addition to the acid or base catalyst. In one embodiment, the catalyst is a tin catalyst. The tin catalyst includes, but is not limited to, di-n-butyldiacetoxytin or di-n-butyldilauryltin.

The solvent may be any type of solvent that does not react with the metal oxide precursors and in which the metal oxide precursors are soluble. In one embodiment, the solvents may be polar protics, such as methanol, ethanol or isopropanol, or polar aprotics, such as tetrahydrofuran, or the like or mixtures of the foregoing.

In another embodiment, the electrolyte comprises a mixture of a metal oxide compound having acid functionality and a nonconductive metal oxide compound. The nonconductive metal oxide compound increases the crosslinking density in the electrolyte. In one embodiment, the ratio of the nonconductive metal oxide compound to the acid functionalized metal oxide compound is from about 0:1 to about 12:1. In another embodiment, the ratio of the nonconductive metal oxide compound to the acid functionalized metal oxide compound is from about 1 to about 10:1.

The nonconductive metal oxide compound comprises at least one structural unit selected from the group consisting of formula VI and formula VII:

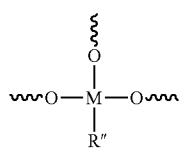

VI

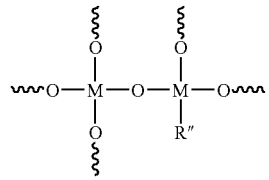

VII wherein M is independently at each occurrence a metal or metalloid selected from the group consisting of Si, Al, Ti, Zr, Sn and Ge; and R" is independently at each occurrence a hydrogen, an aliphatic group, a cylcoaliphatic group or an aromatic group.

The aliphatic group is a radical having a valence of at least one and comprising an array of atoms, which are non-cyclic and not aromatic. In one embodiment, the aliphatic group may be or contain alkyl, alkenyl, haloalkyl, conjugated dienyl, alcohol, ether, aldehyde, ketone, carboxylic acid, acyl, amine, nitro, alkoxy groups and the like. The aliphatic group may be substituted or unsubstituted. Substituted groups may include, but are not limited to, alkoxy, amino, hydroxyl, cyano and mercapto.

In another embodiment, the aliphatic group is a $C_1$-$C_{30}$ alkyl group, a $C_2$-$C_{30}$ alkenyl group, a $C_1$-$C_{30}$ alkoxy group or a haloalkyl group having 1-30 carbon atoms.

In one embodiment, the alkyl group may be methyl, ethyl, n-butyl, t-butyl, isopropyl, pentyl or hexyl.

In another embodiment, the alkenyl group may be allyl or vinyl.

In another embodiment, the alkoxy group is 2-propoxysulfolane or 3-methoxypropyl.

In another embodiment, the haloalkyl group may be a perhaloalkyl group having 1-20 carbon atoms or a partially halogenated $C_1$-$C_{30}$ alkyl group. In one embodiment, the perhaloalkyl group may be perfluorovinyl, trifluoromethyl, bromodifluoromethyl, chlorodifluoromethyl, bromodichloromethyl, trichloromethyl or trifluoromethyl. In another embodiment, the partially halogenated alkyl group includes, but is not limited to, trifluoroethyl, pentafluoropropyl, 3,3,3-trifluoropropyl, tridecafluoro-1,1,2,2-tetrahydro-octyl, heptadecafluoro-1,1,2,2-tetra-hydrodecyl, 3-(heptafluoroisopropoxy)propyl, hexadecafluorododec-11-enyl, nonafluorohexyl, pentafluorophenylpropyl, perfluorododecyl-1H,1H,2H,2H-, 3-trifluoroacetoxypropyl, hexafluoroisopropylidyl, chloromethyl, difluorovinylidyl, bromoethyl or 2-bromotrimethyl.

In one embodiment, the aliphatic group includes, but is not limited to, methyl, ethyl, n-butyl, t-butyl, isopropyl, pentyl, hexyl, allyl, vinyl, 4-aminobutyl, N-(2-aminoethyl)-3-aminopropyl, 2-cyanoethyl, 3-glycidoxypropyl, hydroxymethyl or mercaptopropyl.

The cycloaliphatic group is a radical having a valence of at least one and comprising an array of atoms, which are cyclic, but not aromatic. The cycloaliphatic group may comprise one or more noncyclic components, such as methylene, and functional groups, such as alkyl groups, alkenyl groups, alkynyl groups, haloalkyl groups, conjugated dienyl groups, alcohol groups, ether groups, aldehyde groups, ketone groups, carboxylic acid groups, acyl groups, amine groups, nitro groups, and the like.

In one embodiment, the cycloaliphatic group may be a $C_2$-$C_{30}$ cycloalkyl group, a $C_2$-$C_{30}$ cycloalkoxy group or a halogenated $C_2$-$C_{30}$ cycloalkyl group. In one embodiment, the cycloalkyl group may be cyclohexyl, cyclopentyl, cycloheptyl, cyclopropyl, cyclobutyl, decalyl, tetralin, adamantyl, norbornyl or dicyclopentadienyl.

In another embodiment, the cycloaliphatic group comprises one or more halogen atoms, which may be the same or different. Halogen atoms include, for example; fluorine, chlorine, bromine, and iodine. In one embodiment, the cycloaliphatic group may be 2-trifluoromethylcyclohex-1-yl, 4-bromodifluoromethylcyclooct-1-yl, 2-chlorodifluoromethylcyclohex-1-yl, hexafluoroisopropylidene-2,2-bis(cyclohex-4-yl) (i.e., —$C_6H_{10}C(CF_3)_2$ $C_6H_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl or 2-bromopropylcyclohex-1-yloxy.

In another embodiment, the cycloalkoxy group is 4-allyloxycyclohex-1-yl, 4-aceyloxycyclohex-1-yl, 2,2-dicyanoisopropylidenebis(cyclohex-4-yloxy), methylenebis(cyclohexyl-4-yloxy), hexamethylene-1,6-bis(cyclohex-4-yloxy), 4-methoxycyclohexyl-1-yl, 2-methoxycarbonylcyclohex-1-yloxy, 4-trimethoxysilylethylcyclohex-1-yl.

In another embodiment, the cycloaliphatic group includes, but is not limited to cyclohexyl, cyclopentyl, cycloheptyl, cyclopropyl, cyclobutyl, decalyl, tetralin, adamantyl, norbornyl, dicyclopentadienyl, 2-trifluoromethylcyclohex-1-yl, 4-bromodifluoromethylcyclooct-1-yl, 2-chlorodifluoromethylcyclohex-1-yl, hexafluoroisopropylidene-2,2-bis(cyclohex-4-yl) (i.e., —$C_6H_{10}C(CF_3)_2$ $C_6H_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl or 2-bromopropylcyclohex-1-yloxy, 4-allyloxycyclohex-1-yl, 4-aceyloxycyclohex-1-yl, 2,2-dicyanoisopropylidenebis(cyclohex-4-yloxy), methylenebis(cyclohexyl-4-yloxy), hexamethylene-1,6-bis(cyclohex-4-yloxy), 4-methoxycyclohexyl-1-yl, 2-methoxycarbonylcyclohex-1-yloxy, 4-trimethoxysilylethylcyclohex-1-yl, 4-aminocyclohex-1-yl, 4-aminocarbonylcyclopent-1-yl, 3-methylcyclohex-1-yl, 1-ethylcyclobut-1-yl, cyclopropylethenyl, 3-formyl-2-terahydrofuranyl, 2-hexyl-5-tetrahydrofuranyl, 4-hydroxymethylcyclohex-1-yl, 4-mercaptomethylcyclohex-1-yl, 4-methylthiocyclohex-1-yl, 2-methoxycarbonylcyclohex-1-yl oxy, 4-nitromethylcyclohex-1-yl, 3-trimethylsilylcyclohex-1-yl, 2-t-butyldimethylsilylcyclopent-1-yl, 4-trimethoxysilylethylcyclohex-1-yl, 4-vinylcyclohexen-1-yl, 2-tetrahydrofuranyl, cyclohexylmethyl, 4-methylcyclopent-1-yl or 2-nitrocyclobut-1-yl.

The aromatic group may be substituted or unsubstituted. In one embodiment, the aromatic group is a $C_6$-$C_{30}$ aryl group, a $C_6$-$C_{30}$ aryloxy group or a haloaromatic group. The haloaromatic group may be a perhaloaromatic group or a partially halogenated aromatic group.

In one embodiment, the aromatic group may be phenyl, phenethyl, allylphenyl, m-aminophenyl, p-methoxyphenyl, methacryloxymethyl, benzyl, benzyloxy, biphenyl, tolyl, napthyl, pentafluorophenyl, p-trifluoromethyltetrafluorophenyl, p-fluorophenyl or p-trifluoromethylphenyl.

In one embodiment, M is silicon. In another embodiment, the nonconductive metal oxide compound comprises a silicon-oxygen network. In another embodiment, the nonconductive metal oxide comprises at least one structural unit selected from the group consisting of formula VIII and formula IX:

   VIII

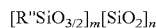   IX wherein R" is independently at each occurrence a hydrogen, an aliphatic group, a cycloaliphatic group or an aromatic group; n is a number from about 2 to about 1000; and m is a number from about 2 to about 1000. In one embodiment, n is a number from about 10 to about 1000. In another embodiment, n is a number from about 10 to about 500, including from about 50 to about 500. In another embodiment, n is a number from about 50 to about 100. In one embodiment, m is a number from about 10 to about 1000, including from about 50 to about 500. In another embodiment, m is a number from about 50 to about 100.

The aliphatic group is a radical having a valence of at least one and comprising an array of atoms, which are non-cyclic and not aromatic. In one embodiment, the aliphatic group may be or contain alkyl, alkenyl, haloalkyl, conjugated dienyl, alcohol, ether, aldehyde, ketone, carboxylic acid, acyl, amine, nitro, alkoxy groups, and the like. The aliphatic group may be substituted or unsubstituted. Substituted groups may include, but are not limited to, alkoxy, amino, hydroxyl, cyano and mercapto.

In another embodiment, the aliphatic group is a $C_1$-$C_{30}$ alkyl group, a $C_2$-$C_{30}$ alkenyl group, a $C_1$-$C_{30}$ alkoxy group or a haloalkyl group having 1-30 carbon atoms.

In one embodiment, the alkyl group may be methyl, ethyl, n-butyl, t-butyl, isopropyl, pentyl or hexyl.

In another embodiment, the alkenyl group may be allyl or vinyl.

In another embodiment, the alkoxy group is 2-propoxysulfolane or 3-methoxypropyl.

In another embodiment, the haloalkyl group may be a perhaloalkyl group having 1-20 carbon atoms or a partially halogenated $C_1$-$C_{30}$ alkyl group. In one embodiment, the perhaloalkyl group may be perfluorovinyl, trifluoromethyl, bromodifluoromethyl, chlorodifluoromethyl, bromodichloromethyl, trichloromethyl or trifluoromethyl. In another embodiment, the partially halogenated alkyl group includes, but is not limited to, trifluoroethyl, pentafluoropropyl, 3,3,3-trifluoropropyl, tridecafluoro-1,1,2,2-tetrahydro-octyl, heptadecafluoro-1,1,2,2-tetra-hydrodecyl, 3-(heptafluoroisopropoxy)propyl, hexadecafluorododec-11-enyl, nonafluorohexyl, pentafluorophenylpropyl, perfluorododecyl-1H,1H,2H,2H-, 3-trifluoroacetoxypropyl, hexafluoroisopropylidyl, chloromethyl, difluorovinylidyl, bromoethyl or 2-bromotrimethyl.

In one embodiment, the aliphatic group includes, but is not limited to, methyl, ethyl, n-butyl, t-butyl, isopropyl, pentyl, hexyl, allyl, vinyl, allyloxy, 4-aminobutyl, N-(2-aminoethyl)-3-aminopropyl, 2-cyanoethyl, 3-glycidoxypropyl, hydroxymethyl or mercaptopropyl.

The cycloaliphatic group is a radical having a valence of at least one and comprising an array of atoms, which are cyclic, but not aromatic. The cycloaliphatic group may comprise one or more noncyclic components, such as methylene, and functional groups, such as alkyl groups, alkenyl groups, alkynyl groups, haloalkyl groups, conjugated dienyl groups, alcohol groups, ether groups, aldehyde groups, ketone groups, carboxylic acid groups, acyl groups, amine groups, nitro groups, and the like.

In one embodiment, the cycloaliphatic group may be a $C_2$-$C_{30}$ cycloalkyl group, a $C_2$-$C_{30}$ cycloalkoxy group or a halogenated $C_2$-$C_{30}$ cycloalkyl group. In one embodiment, the cycloalkyl group may be cyclohexyl, cyclopentyl, cycloheptyl, cyclopropyl, cyclobutyl, decalyl, tetralin, adamantyl, norbornyl or dicyclopentadienyl.

In another embodiment, the cycloaliphatic group comprises one or more halogen atoms, which may be the same or different. Halogen atoms include, for example; fluorine, chlorine, bromine, and iodine. In one embodiment, the cycloaliphatic group may be 2-trifluoromethylcyclohex-1-yl, 4-bromodifluoromethylcyclooct-1-yl, 2-chlorodifluoromethylcyclohex-1-yl, hexafluoroisopropylidene-2,2-bis(cyclohex-4-yl) (i.e., —$C_6H_{10}C(CF_3)_2$ $C_6H_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl or 2-bromopropylcyclohex-1-yloxy.

In another embodiment, the cycloalkoxy group is 4-allyloxycyclohex-1-yl, 4-aceyloxycyclohex-1-yl, 2,2-dicyanoisopropylidenebis(cyclohex-4-yloxy), methylenebis(cyclohexyl-4-yloxy), hexamethylene-1,6-bis(cyclohex-4-yloxy), 4-methoxycyclohexyl-1-yl, 2-methoxycarbonylcyclohex-1-yloxy, 4-trimethoxysilylethylcyclohex-1-yl.

In another embodiment, the cycloaliphatic group includes, but is not limited to cyclohexyl, cyclopentyl, cycloheptyl, cyclopropyl, cyclobutyl, decalyl, tetralin, adamantyl, norbornyl, dicyclopentadienyl, 2-trifluoromethylcyclohex-1-yl, 4-bromodifluoromethylcyclooct-1-yl, 2-chlorodifluoromethylcyclohex-1-yl, hexafluoroisopropylidene-2,2-bis(cyclohex-4-yl) (i.e., —$C_6H_{10}C(CF_3)_2$ $C_6H_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethyl cyclopent-1-yl or 2-bromopropylcyclohex-1-yloxy, 4-allyloxycyclohex-1-yl, 4-aceyloxycyclohex-1-yl, 2,2-dicyanoisopropylidenebis(cyclohex-4-yloxy), methylenebis(cyclohexyl-4-yloxy), hexamethylene-1,6-bis(cyclohex-4-yloxy), 4-methoxycyclohexyl-1-yl, 2-methoxycarbonylcyclohex-1-yloxy, 4-trimethoxysilylethylcyclohex-1-yl, 4-aminocyclohex-1-yl, 4-aminocarbonylcyclopent-1-yl, 3-methylcyclohex-1-yl, 1-ethylcyclobut-1-yl, cyclopropylethenyl, 3-formyl-2-terahydrofuranyl, 2-hexyl-5-tetrahydrofuranyl, 4-hydroxymethylcyclohex-1-yl, 4-mercaptomethylcyclohex-1-yl, 4-methylthiocyclohex-1-yl, 2-methoxycarbonylcyclohex-1-yloxy, 4-nitromethylcyclohex-1-yl, 3-trimethyl silyl cyclohex-1-yl, 2-t-butyldimethylsilylcyclopent-1-yl, 4-trimethoxysilylethylcyclohex-1-yl, 4-vinylcyclohexen-1-yl, 2-tetrahydrofuranyl, cyclohexylmethyl, 4-methylcyclopent-1-yl or 2-nitrocyclobut-1-yl.

The aromatic group may be substituted or unsubstituted. In one embodiment, the aromatic group is a $C_6$-$C_{30}$ aryl group, a $C_6$-$C_{30}$ aryloxy group or a haloaromatic group. The haloaromatic group may be a perhaloaromatic group or a partially halogenated aromatic group.

In one embodiment, the aromatic group may be phenyl, phenethyl, allylphenyl, m-aminophenyl, p-methoxyphenyl, benzyl, benzyloxy, biphenyl, tolyl, napthyl, pentafluorophenyl, p-trifluoromethyltetrafluorophenyl, p-fluorophenyl or p-trifluoromethylphenyl.

The nonconductive metal oxide is prepared by a sol-gel reaction of nonconductive metal oxide precursors. The nonconductive metal oxide precursor is combined with the acid functionalized metal oxide precursors and is hydrolyzed and condensed in a solvent to form acid functionalized metal oxide particles and metal oxide particles, which will crosslink to form a metal oxide network. The nonconductive metal oxide precursor has the structure X:

$$R''_a MX_{4-a} \quad\quad X$$

wherein M is a metal or metalloid selected from the group consisting of Si, Al, Ti, Zr, Sn and Ge; X is a halogen or $C_1$-$C_{10}$ alkoxy radical; a is an integer from 1 to 3; and R" is independently at each occurrence a hydrogen, an aliphatic group, a cycloaliphatic group or an aromatic group.

The aliphatic group is a radical having a valence of at least one and comprising an array of atoms, which are non-cyclic and not aromatic. In one embodiment, the aliphatic group may be or contain alkyl, alkenyl, haloalkyl, conjugated dienyl, alcohol, ether, aldehyde, ketone, carboxylic acid, acyl, amine, nitro, alkoxy groups and the like. The aliphatic group may be substituted or unsubstituted. Substituted groups may include, but are not limited to, alkoxy, amino, hydroxyl, cyano and mercapto.

In another embodiment, the aliphatic group is a $C_1$-$C_{30}$ alkyl group, a $C_2$-$C_{30}$ alkenyl group, a $C_1$-$C_{30}$ alkoxy group or a haloalkyl group having 1-30 carbon atoms.

In one embodiment, the alkyl group may be methyl, ethyl, n-butyl, t-butyl, isopropyl, pentyl or hexyl.

In another embodiment, the alkenyl group may be allyl or vinyl.

In another embodiment, the alkoxy group is 2-propoxysulfolane or 3-methoxypropyl.

In another embodiment, the haloalkyl group may be a perhaloalkyl group having 1-20 carbon atoms or a partially halogenated $C_1$-$C_{30}$ alkyl group. In one embodiment, the perhaloalkyl group may be perfluorovinyl, trifluoromethyl, bromodifluoromethyl, chlorodifluoromethyl, bromodichloromethyl, trichloromethyl or trifluoromethyl. In another embodiment, the partially halogenated alkyl group includes, but is not limited to, trifluoroethyl, pentafluoropropyl, 3,3,3-trifluoropropyl, tridecafluoro-1,1,2,2-tetrahydro-octyl, heptadecafluoro-1,1,2,2-tetra-hydrodecyl, 3-(heptafluoroisopropoxy)propyl, hexadecafluorododec-11-enyl, nonafluorohexyl, pentafluorophenylpropyl, perfluorododecyl-1H,1H,2H,2H-, 3-trifluoroacetoxypropyl, hexafluoroisopropylidyl, chloromethyl, difluorovinylidyl, bromoethyl or 2-bromotrimethyl.

In one embodiment, the aliphatic group includes, but is not limited to, methyl, ethyl, n-butyl, t-butyl, isopropyl, pentyl, hexyl, allyl, vinyl, 4-aminobutyl, N-(2-aminoethyl)-3-aminopropyl, 2-cyanoethyl, 3-glycidoxypropyl, hydroxymethyl or mercaptopropyl.

The cycloaliphatic group is a radical having a valence of at least one and comprising an array of atoms, which are cyclic, but not aromatic. The cycloaliphatic group may comprise one or more noncyclic components, such as methylene, and functional groups, such as alkyl groups, alkenyl groups, alkynyl groups, haloalkyl groups, conjugated dienyl groups, alcohol groups, ether groups, aldehyde groups, ketone groups, carboxylic acid groups, acyl groups, amine groups, nitro groups, and the like.

In one embodiment, the cycloaliphatic group may be a $C_2$-$C_{30}$ cycloalkyl group, a $C_2$-$C_{30}$ cycloalkoxy group or a halogenated $C_2$-$C_{30}$ cycloalkyl group. In one embodiment, the cycloalkyl group may be cyclohexyl, cyclopentyl, cycloheptyl, cyclopropyl, cyclobutyl, decalyl, tetralin, adamantyl, norbornyl or dicyclopentadienyl.

In another embodiment, the cycloaliphatic group comprises one or more halogen atoms, which may be the same or different. Halogen atoms include, for example; fluorine, chlorine, bromine, and iodine. In one embodiment, the cycloaliphatic group may be 2-trifluoromethylcyclohex-1-yl, 4-bromodifluoromethylcyclooct-1-yl, 2-chlorodifluoromethylcyclohex-1-yl, hexafluoroisopropylidene-2,2-bis (cyclohex-4-yl) (i.e., —$C_6H_{10}C(CF_3)_2$ $C_6H_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl or 2-bromopropylcyclohex-1-yloxy.

In another embodiment, the cycloalkoxy group is 4-allyloxycyclohex-1-yl, 4-aceyloxycyclohex-1-yl, 2,2-dicyanoisopropylidenebis(cyclohex-4-yloxy), methylenebis(cyclohexyl-4-yloxy), hexamethylene-1,6-bis(cyclohex-4-yloxy), 4-methoxycyclohexyl-1-yl, 2-methoxycarbonylcyclohex-1-yloxy, 4-trimethoxysilylethylcyclohex-1-yl.

In another embodiment, the cycloaliphatic group includes, but is not limited to cyclohexyl, cyclopentyl, cycloheptyl, cyclopropyl, cyclobutyl, decalyl, tetralin, adamantyl, norbornyl, dicyclopentadienyl, 2-trifluoromethylcyclohex-1-yl, 4-bromodifluoromethylcyclooct-1-yl, 2-chlorodifluoromethylcyclohex-1-yl, hexafluoroisopropylidene-2,2-bis(cyclohex-4-yl) (i.e., —$C_6H_{10}C(CF_3)_2$ $C_6H_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl or 2-bromopropylcyclohex-1-yloxy, 4-allyloxycyclohex-1-yl, 4-aceyloxycyclohex-1-yl, 2,2-dicyanoisopropylidenebis(cyclohex-4-yloxy), methylenebis(cyclohexyl-4-yloxy), hexamethylene-1,6-bis(cyclohex-4-yloxy), 4-methoxycyclohexyl-1-yl, 2-methoxycarbonylcyclohex-1-yloxy, 4-trimethoxysilylethylcyclohex-1-yl, 4-aminocyclohex-1-yl, 4-aminocarbonylcyclopent-1-yl, 3-methylcyclohex-1-yl, 1-ethylcyclobut-1-yl, cyclopropylethenyl, 3-formyl-2-terahydrofuranyl, 2-hexyl-5-tetrahydrofuranyl, 4-hydroxymethylcyclohex-1-yl, 4-mercaptomethylcyclohex-1-yl, 4-methylthiocyclohex-1-yl, 2-methoxycarbonylcyclohex-1-yloxy, 4-nitromethylcyclohex-1-yl, 3-trimethylsilylcyclohex-1-yl, 2-t-butyldimethylsilylcyclopent-1-yl, 4-trimethoxysilylethylcyclohex-1-yl, 4-vinylcyclohexen-1-yl, 2-tetrahydrofuranyl, cyclohexylmethyl, 4-methylcyclopent-1-yl or 2-nitrocyclobut-1-yl.

The aromatic group may be substituted or unsubstituted. In one embodiment, the aromatic group is a $C_6$-$C_{30}$ aryl group, a $C_6$-$C_{30}$ aryloxy group or a haloaromatic group. The haloaromatic group may be a perhaloaromatic group or a partially halogenated aromatic group.

In one embodiment, the aromatic group may be phenyl, phenethyl, allylphenyl, m-aminophenyl, p-methoxyphenyl, benzyl, benzyloxy, biphenyl, tolyl, napthyl, pentafluorophenyl, p-trifluoromethyltetrafluorophenyl, p-fluorophenyl or p-trifluoromethylphenyl.

In one embodiment, X is methoxy, ethoxy, Cl, Br or I.

In another embodiment, M is silicon.

In one embodiment, the nonconductive metal oxide compound is selected from the group consisting of halosilanes, alkoxysilanes, trihalodisilanes, trialkoxydisilanes and disilazanes. In one embodiment, halosilanes may be monotrihalosilanes, dihalosilanes and trihalosilanes. In another embodiment, halosilanes include, but are not limited to, vinyltrichlorosilane, 8-(bistrichlorosilylethyl)hexa-decafluorooctane, bis((tridecafluoro-1,1,2,2-tetrahydro-octyl)dimethylsiloxy)methylchlorosilane, (heptadecafluoro-1,1,2,2-tetra-hydrodecyl)methyldichlorosilane, (heptadecafluoro-1,1,2,2-tetra-hydrodecyl)trichlorosilane, (3-heptafluoroisopropoxy)propyl-trichlorosilane, hexadecafluorododec-11-enyl-1-trichlorosilane, nonafluorohexyl-trichlorosilane, pentafluorophenyldimethylchlorosilane, pentafluorophenylpropyl-trichlorosilane, (tridecafluoro-1,1,2,2-tetra-hydrooctyl)trichlorosilane and trifluoropropyl-trichlorosilane.

In one embodiment, alkoxysilanes include trialkoxysilanes and tetraalkoxysilanes. In another embodiment, alkoxysilanes includes, but is not limited to, tetraethoxysilane, tetramethoxysilane, 1,4-bis(triethoxysilyl)benzene, bis(trimethoxysilyl)ethane, vinyltrimethoxysilane, p-tolyltrimethoxysilane, styrylethyltrimethoxysilane, methacryloxypropyltrimethoxysilane, methacryloxymethyltrimethoxysilane, 3-isocyanotopropyltrimethoxysilane, (3,3,3-trifluoropropyl)trimethoxysilane, (heptadecafluoro-1,1,2,2-tetra-hydrodecyl)triethoxysilane, (heptadecafluoro-1,1,2,2-tetra-hydrodecyl)trimethoxysilane, nonafluorohexyltrimethoxysilane, pentafluorophenylpropyl-trimethoxysilane, pentafluorophenyltriethoxysilane, perfluorododecyl-1H, 1H,2H,2H-triethoxysilane, (tridecafluoro-1,1,2,2-tetra-hydrooctyl)triethoxysilane, (tridecafluoro-1,1,2,2-tetra-hydrooctyl)trimethoxysilane, 3-trifluoroacetoxypropyltrimethoxysilane, p-trifluoromethyltetrafluorophenyltriethoxysilane, trifluoropropylmethyldimethoxysilane, trifluoropropyltrimethoxysilane, and 3-trifluoroacetoxypropyltrimethoxysilane.

Trihalodisilanes and trialkoxydisilanes, include, but are not limited to, hexaethoxydisilane, hexamethoxydisilane and hexachlorodisilane. Disilazanes includes, but is not limited to, 1,3-Bis(chloromethyl)-1,1,3,3-tetramethyldisilazane, bis(trifluoropropyl)tetramethyldisilazane, 1,3-divinyltetramethyldisilazane or 1,3-divinyl-1,3-diphenyl-1,3-dimethyldisilazane.

In one embodiment, the ratio of the nonconductive metal oxide precursor to the acid functionalized metal oxide precursor is from about 0:1 to about 12:1. In another embodiment, the ratio of the nonconductive metal oxide precursor to the acid functionalized metal oxide precursor is from about 1 to about 10:1.

In another embodiment, the electrolyte comprises a mixture of a metal oxide compound having acid functionality and an inorganic filler. The inorganic filler increases the crosslinking density in the inorganic oxide network by formation of bonds with the metal oxide precursors on the surface of the fillers. Increases in crosslinking density help to prevent the swelling and leaching of the electrolytes formed by the sol-gel reaction.

The inorganic fillers may be any conventional inorganic filler. In one embodiment, the inorganic filler may be silica, titania, zirconia, heteropolyacids, zeolites and clays. In one embodiment, the silica may be colloidal silica, fumed silica or precipitated silica.

In one embodiment, the amount of inorganic filler ranges from about 0.1 percent by weight to about 50 percent by weight, based on the weight of the electrolyte. In another embodiment, the amount of inorganic filler is from about 1 percent by weight to about 50 percent by weight, based on the weight of the electrolyte, including from about 10 percent by weight to about 40 percent by weight, based on the weight of the electrolyte.

The inorganic filler is added to the sol-gel reaction with the metal oxide precursor having acidic functionality to prepare the electrolyte. In one embodiment the inorganic fillers are suspended in alcohol or in water and added to the sol-gel solution. In another embodiment, the inorganic fillers are dissolved in the solvent used for the sol-gel reaction before adding to the sol-gel reaction.

In another embodiment, the electrolyte comprises a mixture of a metal oxide compound having acid functionality, a nonconductive metal oxide compound and an inorganic filler. The nonconductive metal oxide compound and inorganic filler increase the cross-linking density in the metal oxide network. Increases in crosslinking density help to prevent the swelling and leaching of the electrolytes formed by the sol-gel reaction.

The inorganic fillers are added to the sol-gel reaction with the nonconductive metal oxide precursor and the metal oxide precursor having acidic functionality to prepare the electrolyte. In one embodiment the inorganic fillers are suspended in alcohol or in water and added to the sol-gel solution. In another embodiment, the inorganic fillers are dissolved in the solvent used for the sol-gel reaction before adding to the sol-gel reaction.

In another embodiment, a method is described for making a polymer electrolyte membrane by impregnating the pores of a porous base membrane with metal oxide precursors having acid functionality and reacting the metal oxide precursor to form metal oxide compounds having acid functionality.

In one embodiment, the polymer electrolyte membrane is prepared by impregnating a base membrane with an electrolyte. The electrolyte is prepared by sol-gel reactions of metal oxide precursors. In one embodiment, the metal oxide precursors are dispersed throughout the membrane as a solution prior to the sol-gel reaction, which will provide a uniform dispersion and control in particle size and concentration. The even distribution of the metal oxide precursors produces a metal oxide network that is fully integrated throughout the membrane.

In one embodiment, the electrolytes at least partially occlude the porous structure. In another embodiment, the electrolytes fill 90% or more of the interior volume of the membrane. In another embodiment, the electrolytes fully occlude the porous structure. In another embodiment, the electrolytes fill the membrane, so that the membrane contains no pin holes or other discontinuities throughout the membrane structure.

The acid-functional metal oxide precursor is infiltrated into the base membrane by any conventional means. In one embodiment, the precursor may be applied by solution deposition, high pressure solution deposition, vacuum filtration, painting, gravure coating, dipping, spin-coating, spraying and air brushing. In one embodiment, the precursor is applied to the base membrane using a densified gas, for example, a supercritical fluid or a near critical fluid, as a solvent. In another embodiment, the precursor is applied by solution deposition.

Other additives such as corrosion inhibitors, antioxidants, or other stabilizers could also be used in combination with these polymers.

The membrane may have a plurality of sub layers. The sub layers may be the same as, or different from, each other. In one aspect, one or more sub layer may include the polymer electrolyte membrane, while another sub layer may provide a property, such as, for example, reinforcement, selective filtering, flexibility, support, flow control and the like.

The membrane may be used as, for example, a proton exchange membrane (PEM) in a fuel cell. Other suitable applications may include liquid filtration, polarity-based chemical separations, electrolysis, batteries, pervaporization, gas separation, dialysis separation, industrial electrochemistry such as chloralkali production and electrochemical applications, super acid catalysts, or use as a medium in enzyme immobilization. Still other suitable applications may include medical devices, such as tissue growth scaffolding.

In order that those skilled in the art will be better able to practice the present disclosure, the following examples are given by way of illustration and not by way of limitation.

EXAMPLES

Example 1

Diethylphosphatoethyltriethoxysilane (PhosTMOS) (available from Gelest Inc.) was hydrolyzed in concentrated HCl. The hydrolyzed silane was mixed with 20% by weight isopropanol to prepare a solution. The solution was cast on an ePTFE membrane to coat the membrane and the membrane was completely wet on both sides. The obtained membranes were dried at room temperature overnight and further heated at 150° C. in nitrogen. During the process, the sol-gel reaction of the silane produced corresponding metal oxide compounds with the acid functionality inside the pores of ePTFE.

Figure 2A:
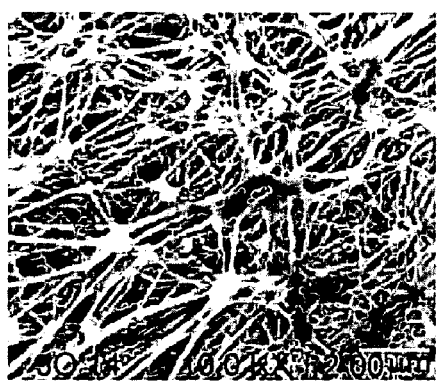
FIG. 2A is a pictorial representation of a micrograph image (bar 2 μm) of an ePTFE membrane.
Figure 2B:
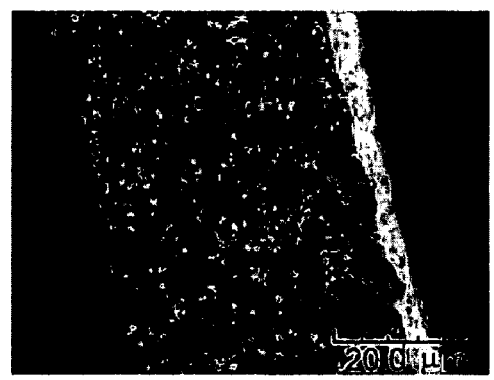
FIG. 2B is a pictorial representation of a micrograph image (bar 10 μm) of an ePTFE membrane following impregnation and a sol-gel reaction with diethylphosphatoethyltriethoxysilane.
Figure 2C:
FIG. 2C is a pictorial representation of a micrograph image (bar 1 μm) of an ePTFE membrane following impregnation and a sol-gel reaction with diethylphosphatoethyltriethoxysilane.

An ePTFE membrane filed with diethylphosphatoethyltriethoxysilane and reacted in a sol-gel reaction is shown in FIG. 2. It shows that the metal oxide compounds with the acid functional groups obtained from the acid silane filled the pores of the ePTFE base membrane uniformly. FIG. 2A is a pictorial representation of a micrograph image (bar 2 μm) showing an ePTFE membrane before treatment. FIG. 2B is a pictorial representation of a micrograph image (bar 10 μm) showing an ePTFE membrane following impregnation and a sol-gel reaction with diethylphosphatoethyltriethoxysilane. FIG. 2C is a pictorial representation of a micrograph image (bar 1 μm) showing the ePTFE membrane following impregnation and a sol-gel reaction with diethylphosphatoethyltriethoxysilane at a higher magnification.

Figure 3A:
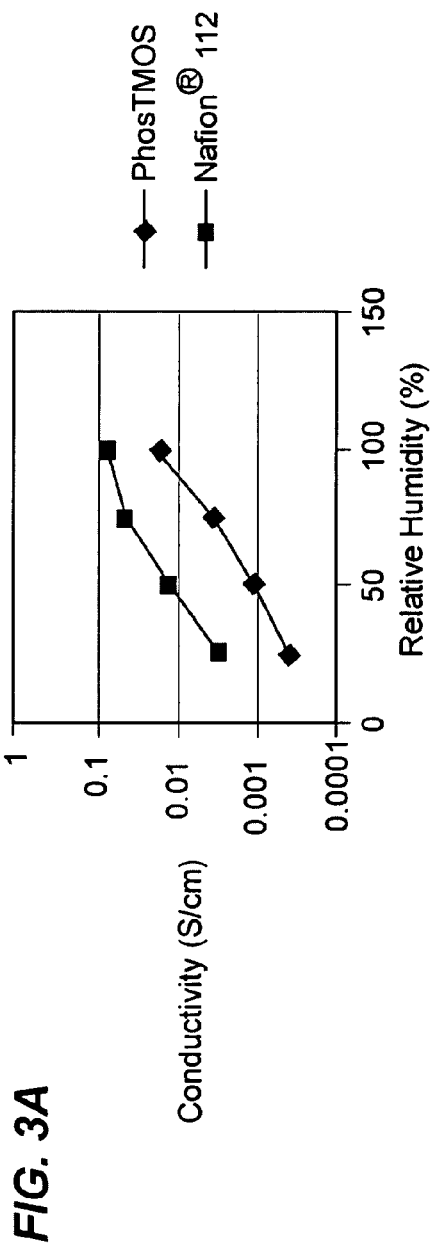
FIG. 3A is a graph showing the in-plane conductivities of membrane samples. The graph is conductivity (S/cm) at 80° C. versus relative humidity (%).
Figure 3B:
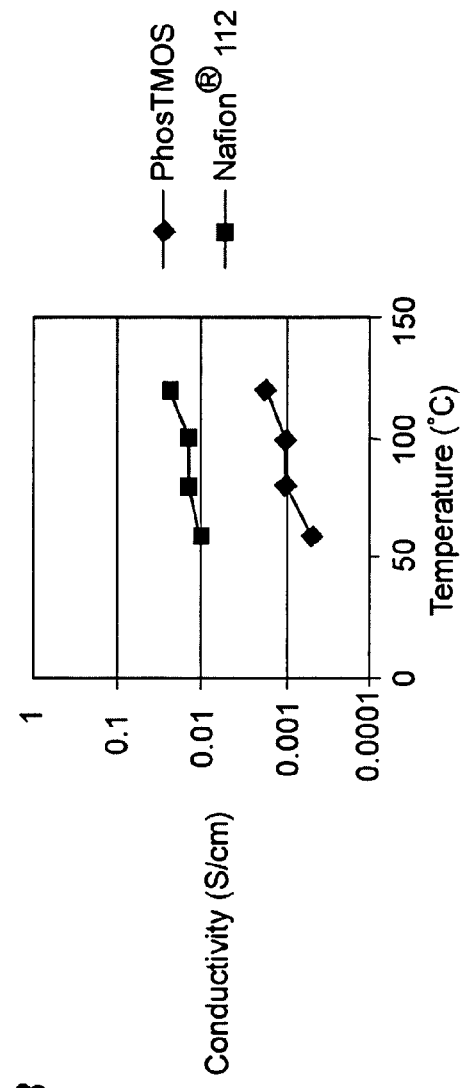
FIG. 3B is a graph showing the in-plane conductivities of membrane samples. The graph is conductivity (S/cm) at 50% relative humidity versus temperature in ° C.

The in-plane conductivity of the ePTFE membrane impregnated with diethylphosphatoethyltriethoxysilane is shown in FIG. 3 with a control film prepared from a polyperfluorosulfonic acid ionomer, Nafion® 112, which is available from E.I. DuPont de Nemours & Co. FIG. 3A is a graph showing the in-plane conductivities (S/cm) for the membrane samples with different relative humidity at 80° C. FIG. 3B is a graph showing the in-plane conductivities (S/cm) at 50% relative humidity for the membrane samples at different temperatures in ° C.

The conductivity test to measure the conductivity of the polymer membrane films was measured with a four-electrode AC impedance using a Parstat impedance analyzer with PowerSine software, using a signal amplitude that ranged from 5 to 50 mV and frequencies ranging from 2 Hz to 2 MHz. The film sample dimensions varied between samples, with a typical film sample being 1.5 cm×2.5 cm and having a thicknesses ranging from 20 to 100 μm.

Example 1 has lower conductivity than the Nafion® control film, but demonstrates good conductivity while maintaining a strong and durable membrane.

Example 2

2-(4-Chlorosulfonylphenyl)ethyltrimethoxysilane (CSTMOS) (available from Gelest Inc.) was impregnated into ePTFE using the sol-gel reaction in a mixture of isopropanol and water as described in Example 1.

Figure 4:
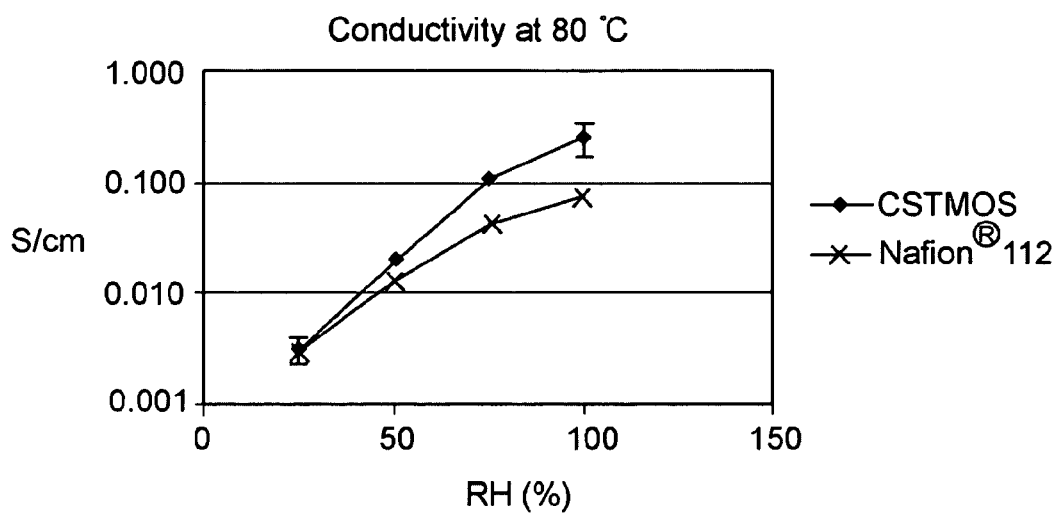
FIG. 4 is a graph showing the in-plane conductivities of membrane samples. The graph is conductivity (S/cm) versus relative humidity (%) at 80° C.

FIG. 4 is a graph showing the in-plane conductivities of the ePTFE membrane impregnated and reacted in a sol-gel reaction with CSTMOS and a membrane prepared from Nafion® 112. The conductivities (S/cm) were obtained with different relative humidity at 80° C.

As shown on the graph, the ePTFE prepared with the sol-gel reaction of CSTMOS demonstrates remarkable conductivity. The value is 2.5 times higher than Nafion® 112 at 100% RH. The conductivity goes down with decreasing relative humidity, but outperforms the Nafion® 112 membrane over the wide range of relative humidity. CSTMOS is soluble in water and can leach out of the impregnated membrane. Example 3 demonstrates membranes having improved stability against water extraction.

Example 3

In accordance with Example 1, ePTFE was impregnated with a mixture of 2-(4-chlorosulfonylphenyl)ethyltrimethoxysilane (CSTMOS) and tetraethoxysilane (TEOS) with different ratios as shown in Table 1. The membrane samples were dried for 24 hours at room temperature (25° C.) and cured. The curing times and temperatures are shown in Table 1.

TABLE 1

| Sample | CSTMOS | TEOS | Water/Alkoxy | Curing Temp (° C.) | Curing Time (hours) |
|---|---|---|---|---|---|
| 1 | 1.00 | 0.00 | 1.0 | 100 | 24 |
| 2 | 1.00 | 0.10 | 1.0 | 100 | 24 |
| 3 | 1.00 | 0.20 | 1.0 | 100 | 24 |
| 4 | 1.00 | 0.40 | 1.0 | 100 | 24 |
| 5 | 1.00 | 0.10 | 1.0 | 150 | 24 |
| 6 | 1.00 | 1.00 | 1.0 | 150 | 24 |
| 7 | 1.00 | 2.00 | 1.5 | 150 | 72 |
| 8 | 1.00 | 4.00 | 1.5 | 150 | 72 |
| 9 | 1.00 | 8.00 | 1.5 | 150 | 72 |
| 10 | 1.00 | 12.00 | 1.5 | 150 | 72 |

An extraction test was performed on the samples. The polymer samples were dried at 105° C. for 4 hours and then immediately weighed to obtain the dry weight ($W_{dry}$) for each sample. The samples were then placed in deionized water, heated at 30° C. for 4 hours, dried and weighed to obtain a weight at 30° C. ($W_{30°\,C.}$). The samples were placed in deionized water, heated at 60° C. for 16 hours, dried and weighed to obtain a weight at 60° C. ($W_{60°\,C.}$). The samples were placed in deionized water, heated at 85° C. for 4 hours, dried and weighed to obtain a weight at 85° C. ($W_{85°\,C.}$). The samples were placed in deionized water, boiled at 100° C. for 2 hours, dried and weighed to obtain a weight at 100° C. ($W_{100°\,C.}$). The samples were then dried at 105° C. for 4 hours and weighed immediately to obtain the final dry weight ($W_{dry\,(f)}$). The weight loss at a given temperature was determined by:

% Weight Loss=$((W_{temp}-W_{dry})/W_{dry})*100$

The total weight loss was determined by:

% Weight Loss=$((W_{dry(f)}-W_{dry})/W_{dry})*100$

The weight loss for each sampler per temperature and total weight loss is shown in Table 2.

TABLE 2

| Sample | Weight Loss at 30° C. (%) | Weight Loss at 60° C. (%) | Weight Loss at 85° C. (%) | Weight Loss at 100° C. (%) | Total Weight loss |
|---|---|---|---|---|---|
| 1 | −39.7 | −47.1 | −53.1 | −59.6 | −70.0 |
| 2 | −35.5 | −45.0 | −51.6 | N/A | −70.9 |
| 3 | −36.0 | −50.5 | −58.0 | N/A | −72.8 |
| 4 | −43.7 | −54.6 | −60.1 | N/A | −75.5 |
| 5 | −25.1 | −33.1 | −39.4 | −45.2 | −61.9 |
| 6 | −6.2 | −28.4 | −35.5 | −38.8 | −56.2 |
| 7 | 0.5 | −6.9 | −18.9 | −27.6 | −48.9 |
| 8 | 11.4 | −12.0 | −22.2 | −14.8 | −38.7 |
| 9 | 9.6 | −6.5 | −13.7 | −12.7 | −32.3 |
| 10 | 9.2 | −4.8 | −10.4 | −7.8 | −17.4 |

Figure 5:
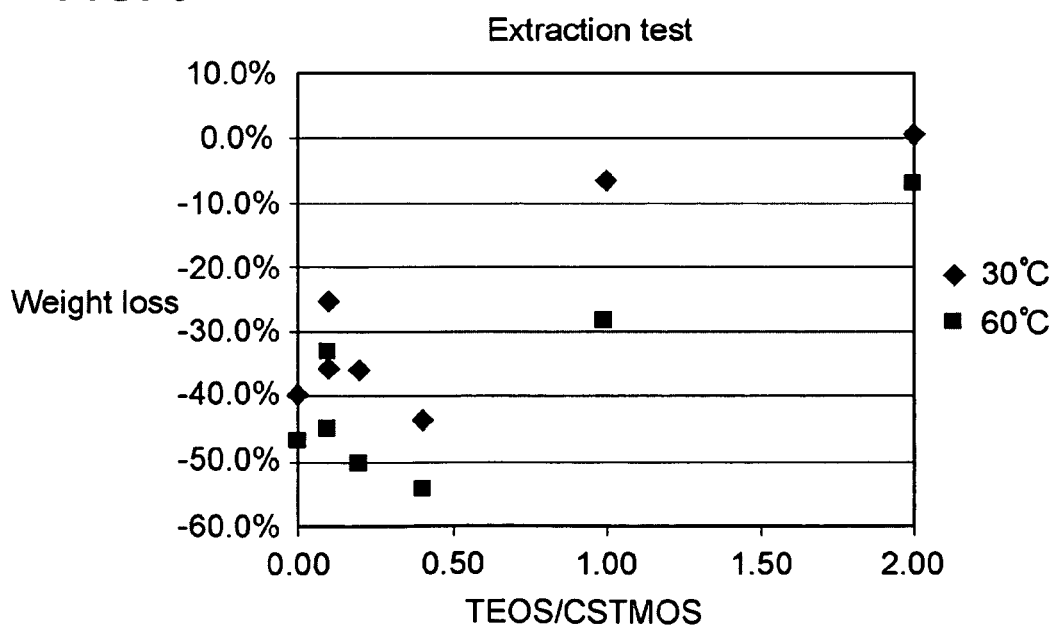
FIG. 5 is a graph showing extractables by water at 30° C. and 60° C. for membrane samples. The graph is weight loss (%) versus the weight ratio of TEOS to CSTMOS.

Samples 1-7 are plotted in FIG. 5, which is a graph showing extraction by water (the percent of weight loss versus weight ratio of TEOS to CSTMOS) for each of the samples at 30° C. and at 60° C. Without any TEOS, 40% and 47% of the materials were lost at 30° C. and 60° C., respectively. The addition of TEOS decreased the amount of extractable. As the TEOS/CSTMOS ratio reached two, there was no extractable at 30° C. and a minor amount at 60° C.

Figure 6:
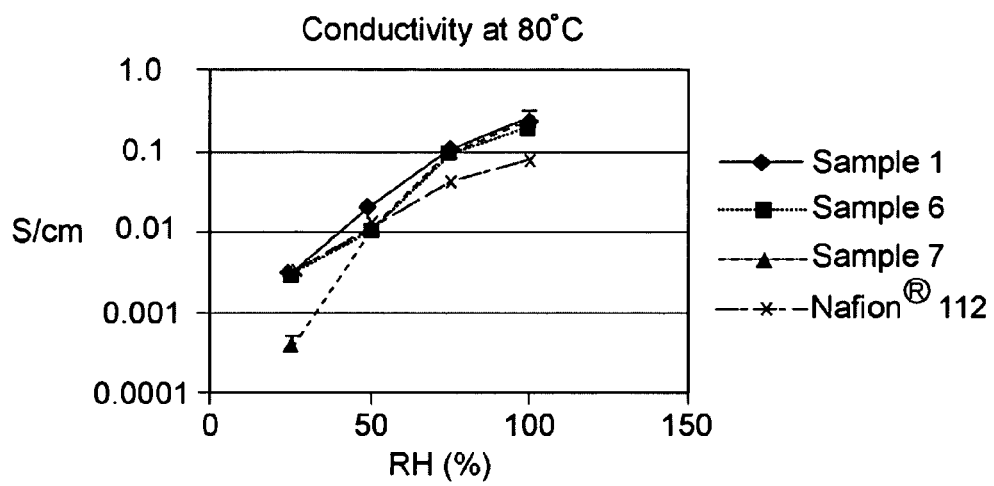
FIG. 6 is a graph showing the in-plane conductivities of membrane samples. The graph is conductivity (S/cm) versus relative humidity (%) at 80° C.

The in-plane conductivity for samples 1, 6, 7 and control sample Nafion® 112 are shown in FIG. 6. The conductivities (S/cm) were obtained with different relative humidity at 80° C. As seen on the graph in FIG. 6, the conductivity of the samples was retained even when the acid silane was decreased to a third of the total composition above 50% RH.

Example 4

In accordance with Example 1, ePTFE was impregnated with a mixture of CSTMOS, TEOS and different types of silica as shown in Table 3. The silica was obtained as suspension in water and mixed with the solution as prepared in Example 3. The membrane samples were dried for 24 hours at room temperature (25° C.) and cured at 150° C. for 72 hours.

TABLE 3

| Sample | CSTMOS | TEOS | Silica | Water/Alkoxy |
|---|---|---|---|---|
| 11 | 1.00 | 1.00 | 1.00[1] | 1.5 |
| 12 | 1.00 | 1.00 | 1.00[2] | 1.5 |
| 13 | 1.00 | 1.00 | 1.00[3] | 1.5 |

[1]spherical colloidal silica
[2]elongated colloidal silica
[3]precipitated silica An extraction test was performed on the samples as described in Example 3. Data for the samples is shown in Table 4. Samples 11 and 12 have decreased weight loss and Sample 13 shows decreased weight loss for the temperature at specific temperatures; although a slightly higher total weight loss.

TABLE 4

| Sample | Weight Loss at 30° C. (%) | Weight Loss at 60° C. (%) | Weight Loss at 85° C. (%) | Weight Loss at 100° C. (%) | Total Weight loss |
|---|---|---|---|---|---|
| 6 | −6.2 | −28.4 | −35.5 | −38.8 | −56.2 |
| 11 | 13.3 | 2.1 | −6.3 | −13.6 | −46.9 |
| 12 | 10.9 | −1.8 | −10.6 | −14.8 | −48.3 |
| 13 | 8.0 | −20.2 | −30.0 | −37.6 | −60.5 |

Figure 7:
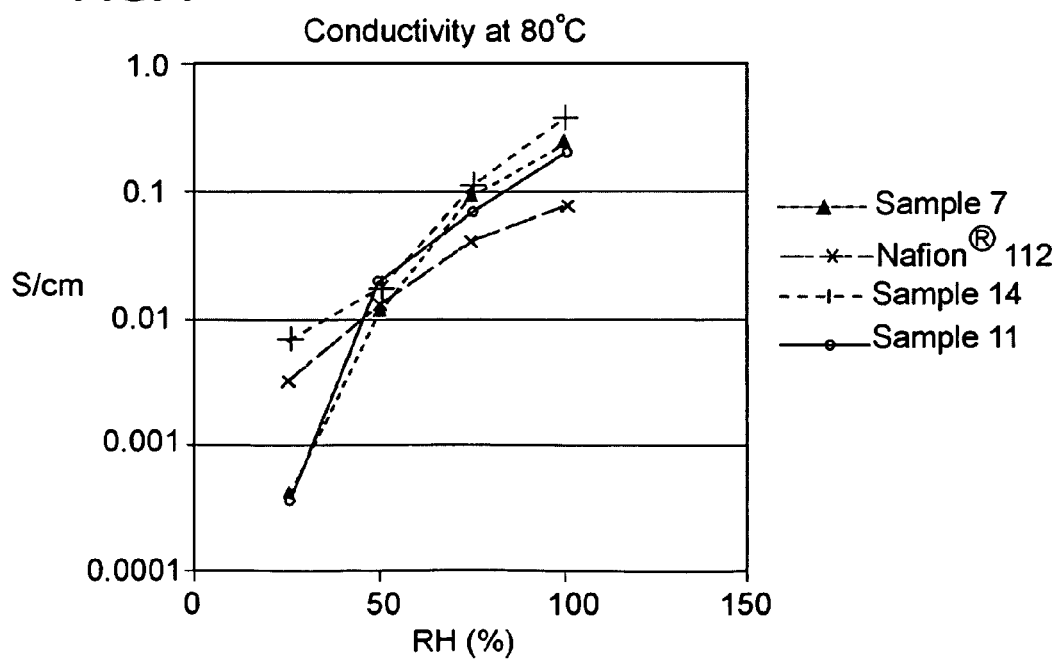
FIG. 7 is a graph showing the in-plane conductivities of membrane samples. The graph is conductivity (S/cm) versus relative humidity (%) at 80° C.

The in-plane conductivity for samples 12 and 13 and control sample Nafion® 112 are shown in Table 5. The conductivity for sample 11 is shown in FIG. 7 (see Example 5). The conductivities were obtained with different relative humidity at 80° C. The samples maintain good conductivity. Sample 13 with the precipitated silica shows improved conductivity over the control sample at a relative humidity of 50% and higher.

TABLE 5

| Sample | 25% RH | 50% RH | 75% RH | 100% RH |
|---|---|---|---|---|
| Nafion ® 112 | 0.0031 | 0.0129 | 0.0430 | 0.0763 |
| 12 | 0.0005 | 0.0056 | 0.0382 | 0.1162 |
| 13 | 0.0003 | 0.0139 | 0.0575 | 0.1143 |

Example 5

In accordance with Example 1, ePTFE was impregnated with a mixture of CSTMOS, TEOS and titanium tetraisopropoxide (TIP), which is a precursor for $TiO_2$. The amounts are shown in Table 6. The TIP was obtained as suspension in water and mixed with the solution as prepared in Example 3. The membrane samples were dried for 24 hours at room temperature (25° C.) and cured at 150° C. for 72 hours.

TABLE 6

| Sample | CSTMOS | TEOS | TIP | Water/Alkoxy |
|---|---|---|---|---|
| 14 | 1.00 | 1.90 | 0.1 | 1.5 |
| 15 | 1.00 | 1.80 | 0.2 | 1.5 |

An extraction test was performed on the samples. Data for the samples is shown in Table 7. Samples 14 and 15 show slightly improved extractable data.

TABLE 7

| Sample | Weight Loss at 30° C. (%) | Weight Loss at 60° C. (%) | Weight Loss at 85° C. (%) | Weight Loss at 100° C. (%) | Total Weight loss |
|---|---|---|---|---|---|
| 6 | −6.2 | −28.4 | −35.5 | −38.8 | −56.2 |
| 14 | 27.4 | −5.8 | −15.6 | −21.0 | −54.0 |
| 15 | 41.7 | 0.3 | −14.3 | −23.5 | −48.1 |

The in-plane conductivity for samples 14 and 15 and control sample Nafion® 112 are shown in Table 8. The conductivities were obtained in mole ratios at 80° C. with different relative humidity. The samples maintain good conductivity. Sample 14 shows improved conductivity over the control sample. FIG. 7 is a graph showing the in-plane conductivity (S/cm) for samples 7, 11, 14 and control sample Nafion® 112 at 80° C. at different relative humidity. As seen on the graph in FIG. 7, the in-plane conductivity was improved by addition of $TiO_2$ especially at lower relative humidity (25%).

TABLE 8

| Sample | 25% RH | 50% RH | 75% RH | 100% RH |
|---|---|---|---|---|
| Nafion ® 112 | 0.0031 | 0.0129 | 0.0430 | 0.0763 |
| 14 | 0.0077 | 0.021 | 0.149 | 0.399 |
| 15 | 0.0000 | 0.0048 | 0.0223 | 0.1822 |

While typical embodiments have been set forth for the purpose of illustration, the foregoing descriptions should not be deemed to be a limitation on the scope herein. Accordingly, various modifications, adaptations and alternatives may occur to one skilled in the art without departing from the spirit and scope herein.

Having described the invention that which is claimed is:

1. A polymer electrolyte membrane comprising a porous base membrane and electrolytes disposed within pores of the porous base membrane, said electrolytes comprising metal oxide compounds having acid functionality, wherein the metal oxide compound having acid functionality comprises at least one structural unit selected from the group consisting of formula I and formula II:

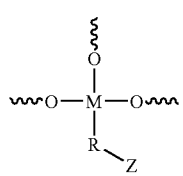

I

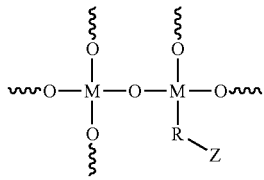

II wherein M is independently at each occurrence a metal or metalloid selected from the group consisting of Si, Al, Ti, Zr, Sn and Ge; R is independently at each occurrence an aliphatic or aromatic diradical or bond; and Z is independently at each occurrence an acid functional group.

2. The membrane of claim 1 comprising a continuous pore structure with numerous interconnecting pores that extend completely through the membrane.

3. The membrane of claim 2 wherein the porous base membrane has a porosity of greater than about 20 percent by volume.

4. The membrane of claim 2 wherein the porous base membrane comprises expanded polytetrafluoroethylene (ePTFE).

5. The membrane of claim 1 wherein the electrolytes at least partially fill the pores of the porous base membrane.

6. The membrane of claim 5 wherein the electrolytes fill 90% or more of the pores in the porous base membrane.

7. The membrane of claim 1 wherein the base membrane comprises polytetrafluoroethylene, polyvinylidene fluoride, polyvinylidene fluoride co-hexafluoropropylene, polytetrafluoroethylene oxide-co-difluoromethylene oxide, polytetrafluoroethylene-co-perfluoropropylvinyl ether, polyolefin, polyamide, polyester, polysulfone, polyether, acrylic-based polymers, polystyrene, polyurethane, polypropylene, polyethylene, polyphenylene sulfone, nylon, polyphenylene oxide, cellulosic polymer or combinations of the foregoing.

8. The membrane of claim 1, wherein the metal oxide compound having acid functionality comprises acid functional groups or latent acid functional groups selected from the group consisting of sulfonic acid, peifluorinated sulfonic acid, partially perfluorinated sulfonic acid, sulfonyl halide, perfluorinated sulfonyl halide, partially perfluorinated sulfonyl halide, dialkyiphosphonate, phosphonic acid, carboxylic acid, carbonyl halide and the alkaline salt forms of the foregoing.

9. The membrane of claim 1 wherein M is silicon.

10. The membrane of claim 1 wherein the electrolyte further comprises a nonconductive metal oxide compound.

11. The membrane of claim 10, wherein the nonconductive metal oxide compound comprises at least one structural unit selected from the group consisting of formula VI and formula VII:

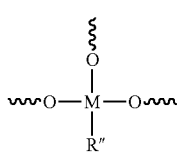

VI

-continued

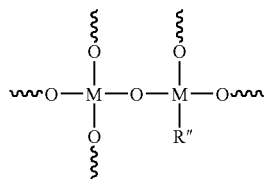

wherein M is independently at each occurrence a metal or metalloid selected from the group consisting of Si, Al, Ti, Zr, Sn and Ge; and R″ is independently at each occurrence a hydrogen, an aliphatic group, a cylcoaliphatic group or an aromatic group.

12. The membrane of claim 10 wherein the nonconductive metal oxide compound is selected from the group consisting of halosilanes, alkoxysilanes, trihalodisilanes, trialkoxydisilanes and disilazanes.

13. The membrane of claim 10 wherein the ratio of the nonconductive metal oxide compound to the acid functionalized metal oxide compound is from about 0:1 to about 12:1.

14. The membrane of claim 10 wherein the electrolyte further comprises an inorganic filler.

15. The membrane of claim 14, wherein the inorganic filler may be silica, titania, zirconia, heteropolyacids, zeolites and clays.

16. The membrane of claim 1 wherein the electrolyte further comprises an inorganic filler.

17. The membrane of claim 16, wherein the inorganic filler may be silica, titania, zirconia, heteropolyacids, zeolites and clays.

18. The membrane of claim 16, wherein the amount of inorganic filler ranges from about 0.1 percent by weight to about 50 percent by weight, based on the weight of the electrolyte.

19. A method for making a polymer electrolyte membrane by impregnating the pores of a porous base membrane with metal oxide precursors having acid functionality and reacting the metal oxide precursors to form metal oxide compounds having acid functionality, wherein the acid functionalized metal oxide precursor has formula V:

$$A_aMX_{4-a} \quad V$$

wherein A is —R—Z; R is independently at each occurrence an aliphatic or aromatic diradical or bond; Z is independently at each occurrence an acid functional group; X is a halogen or a $C_1$-$C_{10}$ alkoxy radical; M is a metal or metalloid selected from the group consisting of Si, Al, Ti, Sn, Zr and Ge; and a is a number from about 1 to about 3.

20. The method of claim 19 wherein the metal oxide precursors are impregnated into the pores of the base membrane by an infiltration method selected from the group consisting of solution deposition, high pressure solution deposition, vacuum filtration, painting, gravure coating, dipping, spincoating, spraying and air brushing.

21. The method of claim 19 wherein the base membrane comprises polytetrafluoroethylene, polyvinylidene fluoride, polyvinylidene fluoride co-hexafluoropropylene, polytetrafluoroethylene oxide-co-difluoromethylene oxide, polytetrafluoroethylene-co-perfluoropropylvinyl ether, polyolefin, polyamide, polyester, polysulfone, polyether, acrylic-based polymers, polystyrene, polyurethane, polypropylene, polyethylene,polyphenylene sulfone, nylon, polyphenylene oxide, cellulosic polymer or combinations of the foregoing.

22. The method of claim 19, wherein the metal oxide precursors having acid functionality groups or latent acid functional groups comprise acid functional groups selected from the group consisting of sulfonic acid, perfluorinated sulfonic acid, partially perfluorinated sulfonic acid, sulfonyl halide, perfluorinated sulfonyl halide, partially perfluorinated sulfonyl halide, dialkylphosphate, phosphonic acid, carboxylic acid, carbonyl halide and the alkaline salt forms of the foregoing.

23. The method of claim 19 wherein the method further comprises impregnating a nonconductive metal oxide precursor.

24. The method of claim 23, wherein the nonconductive metal oxide precursor has the structure:

$$R''_aMX_{4-a}$$

wherein M is a metal or metalloid selected from the group consisting of Si, Al, Ti, Zr, Sn and Ge; X is a halogen or $C_1$-$C_{10}$ alkoxy radical; a is an integer from 1 to 3; and R″ is independently at each occurrence a hydrogen, an aliphatic group, a cycloaliphatic group or an aromatic group.

25. The method of claim 19 wherein the method further comprises impregnating the base membrane with an inorganic filler.

26. The method of claim 25, wherein the inorganic filler may be silica, titanic, zirconia, heteropolyacids, zeolites and clays.

27. The method of claim 19, wherein the metal oxide precursors are reacted at a temperature from about 24° C. to about 250° C.

28. A fuel cell comprising a proton exchange membrane comprising a porous base membrane and electrolytes disposed within pores of the porous base membrane, said electrolytes comprising metal oxide compounds having acid functionality, wherein the metal oxide compound having acid functionality comprises at least one structural unit selected from the group consisting of formula I and formula II:

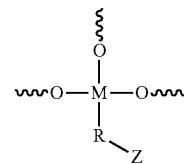

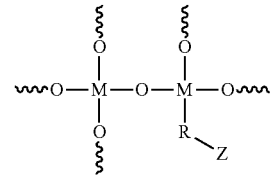

wherein M is independently at each occurrence a metal or metalloid selected from the group consisting of Si, Al, Ti, Zr, Sn and Ge; R is independently at each occurrence an aliphatic or aromatic diradical or bond; and Z is independently at each occurrence an acid functional group.

29. A fuel cell comprising a proton exchange membrane comprising a porous base membrane and electrolytes disposed within pores of the porous base membrane, said electrolytes comprising metal oxide compounds having acid functionality, wherein the metal oxide compound having acid functionality comprises at least one structural unit selected from the group consisting of wherein the acid functionalized metal oxide precursor has formula V:

$$A_aMX_{4-a} \quad V$$

wherein A is —R—Z; R is independently at each occurrence an aliphatic or aromatic diradical or bond; Z is independently at each occurrence an acid functional group; X is a halogen or a $C_1$-$C_{10}$ alkoxy radical; M is a metal or metalloid selected from the group consisting of Si, Al, Ti, Sn, Zr and Ge; and a is a number from about 1 to about 3.

* * * * *

UNITED STATES PATENT AND TRADEMARK OFFICE
CERTIFICATE OF CORRECTION

| | | |
|---|---|---|
| PATENT NO. | : 8,158,301 B2 | Page 1 of 1 |
| APPLICATION NO. | : 12/128660 | |
| DATED | : April 17, 2012 | |
| INVENTOR(S) | : Moore et al. | |

It is certified that error appears in the above-identified patent and that said Letters Patent is hereby corrected as shown below:

In Column 16, Line 6, delete "filed" and insert -- filled --, therefor.

In Column 20, Line 45, in Claim 8, delete "peifluorinated" and insert -- perfluorinated --, therefor.

In Column 20, Line 48, in Claim 8, delete "dialkyiphosphonate," and insert -- dialkylphosphonate, --, therefor.

In Column 21, Line 60, in Claim 21, delete "ethylene,polyphenylene" and insert -- ethylene, polyphenylene --, therefor.

In Column 22, Line 19, in Claim 26, delete "titanic," and insert -- titania, --, therefor.

Signed and Sealed this
Fifth Day of June, 2012

David J. Kappos
*Director of the United States Patent and Trademark Office*